United States Patent [19]

Gorzegno et al.

[11] Patent Number: 5,061,304
[45] Date of Patent: Oct. 29, 1991

[54] STEAM PROCESSING APPARATUS AND METHOD

[75] Inventors: Walter P. Gorzegno, Morristown; William D. Stevens, North Caldwell; Albert J. Zipay, Clifton, all of N.J.

[73] Assignee: Foster Wheeler Energy Corporation, Clinton, N.J.

[21] Appl. No.: 942,070

[22] Filed: Dec. 16, 1986

Related U.S. Application Data

[63] Continuation of Ser. No. 703,441, Feb. 19, 1985, abandoned, which is a continuation of Ser. No. 248,596, Mar. 27, 1981, abandoned.

[51] Int. Cl.⁵ ............................................. B01D 45/12
[52] U.S. Cl. ...................................... 55/347; 122/34; 122/488; 122/489; 122/490; 122/491; 122/492; 55/321; 55/325; 55/346; 55/348; 55/448; 55/452; 55/455; 55/458
[58] Field of Search ................. 55/321, 325, 346–348, 55/448, 452, 455, 458; 122/34, 488–492

[56] References Cited

U.S. PATENT DOCUMENTS

| | | | |
|---|---|---|---|
| 1,948,524 | 2/1934 | Kerr | 122/491 |
| 2,402,154 | 6/1946 | Fletcher | 122/488 |
| 2,594,490 | 4/1952 | Patterson . | |
| 2,666,499 | 1/1954 | Loebel . | |
| 2,715,451 | 8/1955 | Raynor | 122/488 |
| 2,743,709 | 5/1956 | Armacost | 122/488 |
| 2,845,906 | 8/1958 | Gram . | |
| 2,894,599 | 7/1959 | Leininger | 55/325 |
| 3,089,469 | 5/1963 | Mumford | 122/491 |
| 3,251,176 | 5/1966 | Gleason | 55/452 |
| 3,296,779 | 1/1967 | Daman et al. | 122/34 |
| 3,314,220 | 4/1967 | Goldstein | 55/347 |
| 3,324,634 | 6/1967 | Brahler et al. | 122/34 |
| 3,735,569 | 5/1973 | Micheller et al. | 122/34 |
| 3,868,236 | 2/1975 | Meier et al. | 55/455 |
| 3,894,517 | 7/1975 | Meier | 122/34 |
| 3,915,679 | 10/1975 | Roach et al. | 55/348 |
| 3,924,575 | 12/1975 | Zipay | 122/34 |
| 3,992,172 | 11/1976 | Clark | 55/455 |
| 4,099,384 | 7/1978 | Stevens et al. | 122/406 S |
| 4,123,237 | 10/1978 | Zipay et al. | 55/349 |
| 4,182,277 | 1/1980 | Burton et al. | 55/346 |
| 4,261,298 | 4/1981 | McDonald et al. | 122/34 |

FOREIGN PATENT DOCUMENTS 593540  3/1960  Canada ................................. 55/321

Primary Examiner—Robert J. Warden
Assistant Examiner—Timothy M. McMahon
Attorney, Agent, or Firm—Marvin A. Naigur; Warren B. Kice

[57] ABSTRACT

A steam processing apparatus and method in which a plurality of separators are disposed along the length of a cylindrical drum having inlet means for receiving a mixture of liquid and vapor and outlet means for discharging the separated liquid and vapor. The mixture is discharged against a baffle after which the separated liquid is passed to the drum liquid outlet and the separated vapor is passed upwardly by natural buoyant forces to the drum vapor outlet. The separators are disposed in a plurality of rows—two to each side of the axis of the drum along the length thereof.

1 Claim, 2 Drawing Sheets

STEAM PROCESSING APPARATUS AND METHOD

This application is a continuation of application Ser. No. 703,441 (now abandoned), filed Feb. 19, 1985 which, in turn, is a continuation of application Ser. No. 248,596 (now abandoned), filed Mar. 27, 1981.

BACKGROUND OF THE INVENTION

This invention relates to a steam processing apparatus and, more particularly, to an apparatus for receiving a mixture of liquid and vapor, separating the vapor from the liquid and discharging the vapor and the liquid from separate outlets.

In natural circulation vapor generators, mixtures of water and steam rise in heated steam-generating tubes and discharge into one or more large steam drums disposed in an elevated position above the tubes. The drums include means to separate the water from the steam with the latter being removed through openings of the upper portions of the drum and the former being recirculated through downcomers to the boiler and back to the steam generating tubes to complete the natural circulation loop.

In relatively large installations employing natural circulation vapor generators, it is essential that an efficient separation of the steam from the water be effected in the drum with minimal pressure loss in order to furnish steam of the required purity to the point of use, and steam-free water to the circulation system. In these arrangements, the expansion of the water-steam mixture through the separator results in a substantial pressure drop which, if too large, can adversely effect the circulation system. Also at low must have sufficient flow area to minimize pressure loss and still achieve separation.

Many of the prior art arrangements designed to minimize the pressure drop and maximize the flow area have included a drum with an extraordinarily large length which is incompatible from a fabrication standpoint with the furnace width dimension for a given capacity unit. As a result, the drum often overhangs relative to the furnace which tends to increase material and erection costs.

SUMMARY OF THE INVENTION

It is therefore an object of the present invention to provide a steam processing apparatus in which liquid is separated from vapor at a relatively low pressure loss.

It is a further object of the present invention to provide an apparatus of the above type which is of a simple, efficient and inexpensive design.

It is a still further object of the present invention to provide an apparatus of the above type in which a drum is provided, the length of which is relatively short for a given capacity unit and, therefore, can be fabricated in a relatively inexpensive manner.

It is a still further object of the present invention to provide an apparatus of the above type which permits a relatively high loading per foot of drum length.

Toward the fulfillment of these and other objects, the steam processing apparatus of the present invention comprises a cylindrical drum having at least one inlet for receiving a mixture of liquid and vapor from an external source, a first outlet for discharging the liquid, and a second outlet for discharging the vapor. A plurality of rows of separators are disposed along the length of the drum to other side of the axis of the drum. Each separator includes spiral discharge arms and a baffle arrangement for separating the mixture into a liquid and a vapor. The liquid is directed to the first drum outlet and the vapor to the second drum outlet. A portion of each separator of a particular row extends partially into the space between adjacent separators of the adjacent row.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
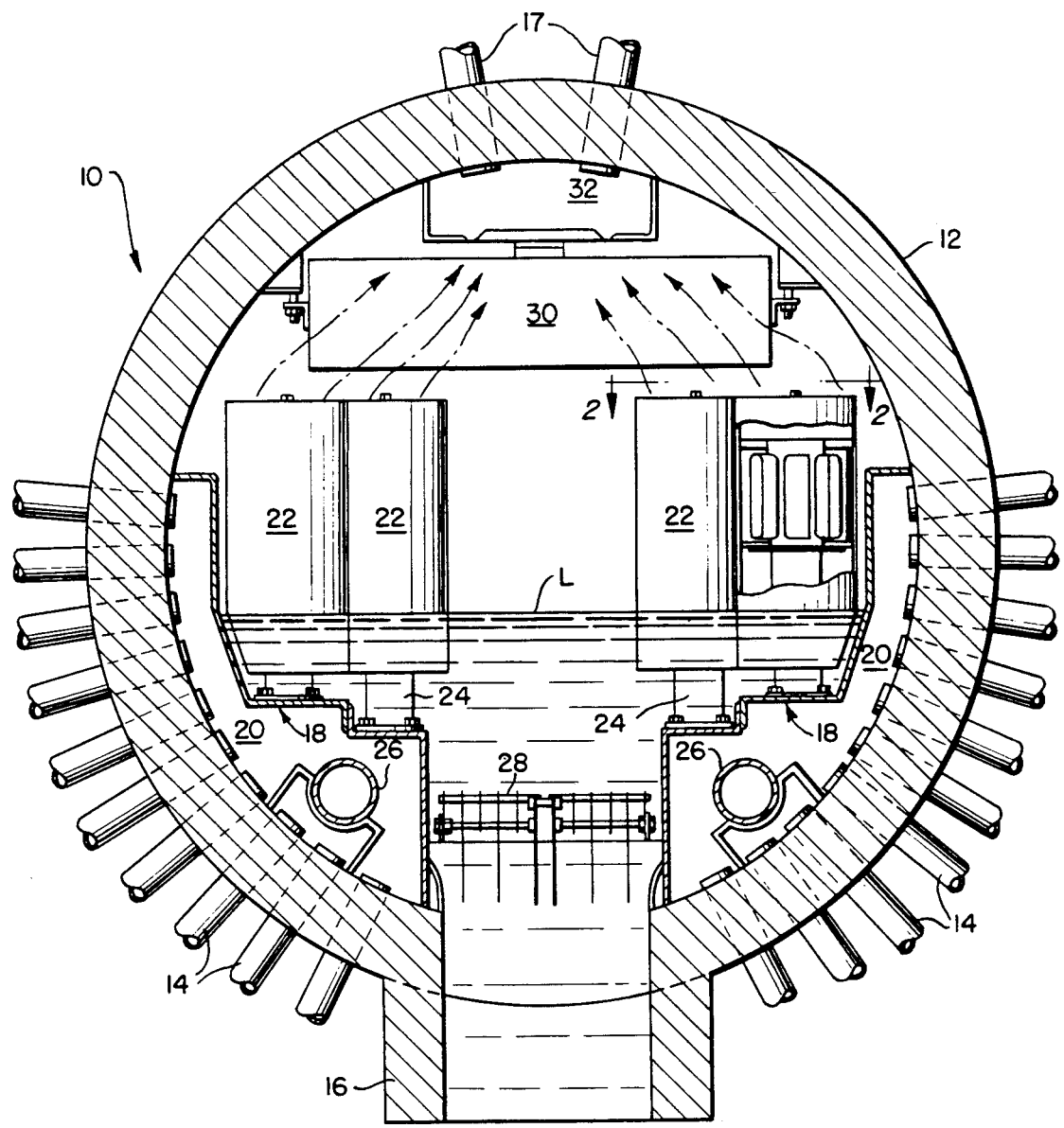
FIG. 1 is a vertical cross-sectional view of the steam processing apparatus of the present invention.

Referring specifically to FIG. 1 of the drawing, the reference numeral 10 refers in general to the steam processing apparatus of the present invention which includes a steam drum 12 which forms a portion of a natural circulation steam-water system. The drum 12 is of an elongated cylindrical shape and is disposed with its axis parallel to the horizontal. The upper end portions of two groups of steam generating risers or tubes 14 extend through the drum 12 and communicate with the interior of the drum to introduce a mixture of water and steam into the drum. A plurality of downcomers (one of which is shown by the reference numeral 16) extend from the lower portion of the drum to discharge the separated water (along with a quantity of feed water) to a furnace (not shown) where the water is heated and recycled back through the drum 12. Dried steam is removed from the drum 12 through a plurality of discharge tubes 17 disposed at the upper portion of the drum.

An elongated girth baffle 18 is provided within the drum immediately above the end portions of the tubes 14 to define a chamber 20 for receiving the mixture of water and steam from the tubes 14. A plurality of separators 22 are disposed in the drum 12 and are arranged in four horizontally extending rows, tow extending to either side of the axis of the drum. Each separator 22 includes a riser pipe 24, the lower end portion of which is bolted to the girth baffle 18. The riser pipes 24 are adapted to receive the water-steam mixture from their respective chambers 20 and separate the mixture into steam and water as will be described in detail later. Although not clear from the drawings, it is noted that the chamber 20 takes the form of a concentric annulus inside the drum 12 that permits flow from one side of the drum to the other. This annulus is interrupted only by the openings in the drum 12 for the downcomers 16 and by the support structure shown. Therefore, water can flow through an open girth area in between the latter openings and support structure.

Two horizontally extending feed pipes 26 are disposed in the chamber 20 and are adapted to introduce water into the drum 12 which flows through the separators 22 with the mixture of water and steam to replenish the supply of steam that is discharged from the separators and, thus, maintain a constant water level, shown by the reference letter L. This water passes downwardly through a vortex eliminator 28 to the downcomer 16 for discharge back into the natural circulation loop. The vortex eliminator 28 operates in a conventional manner to prevent swirling of the water as it discharges from the drum 12 into the downcomer 16, and thus reduces the entrance loss to the downcomer 16. In addition, the vortex eliminator 28 also prevents the steam from being drawn from the upper portion of the drum into the downcomer. Since the vortex eliminator 28 is of a conventional design, it will not be described in any further detail.

A plurality of steam dryers are disposed in the upper portion of the drum 12 with one being shown by the reference numeral 30 in FIG. 1. The dryers 30 are supported by a conventional support structure in a position immediately above the separators 22 and immediately below a dry box 32, also of a conventional design. The dryers 30 include a plurality of plates (not shown) which are in a nested, but spaced, relationship and may be of the chevron type disclosed in U.S. Pat. No. 2,472,101, issued on Jun. 7, 1949. The dryers 30 function to dry the steam discharging from the upper portion of the separators 22 and separate any entrained water particles carried over with the steam as it flows through the space between the nested plates and through the dry box for discharge from the tubes 17.

Figure 2:
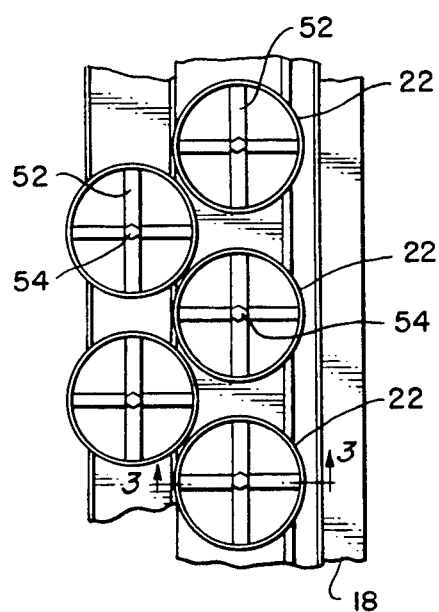
FIG. 2 is a cross-sectional view taken along the line 2—2 of FIG. 1.

As shown in FIG. 2, which depicts the two adjacent rows of separators 22 disposed on one side of the axis of the drum 12, the separators in each row are spaced slightly apart in a horizontal direction with a portion of each separator of a particular row extending partially into the space between adjacent separators of the adjacent row. Of course, this minimizes the space taken up by the separators 22 and contributes to the advantages set forth herein.

Figure 3:
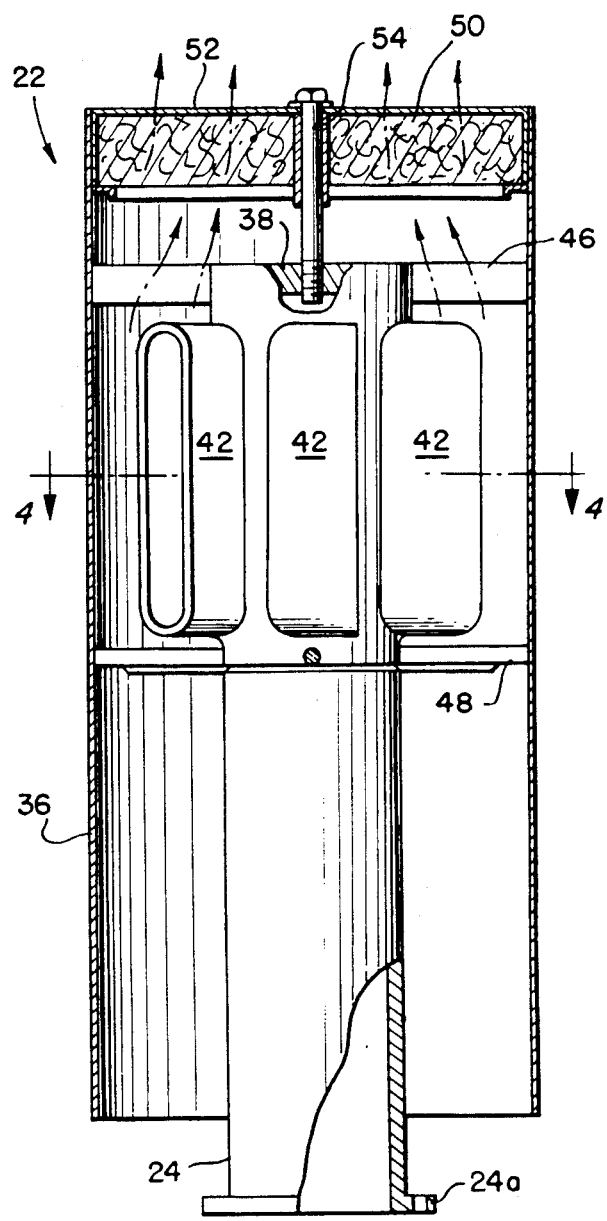
FIG. 3 is a cross-sectional view taken along line 3—3 of FIG. 2.
Figure 4:
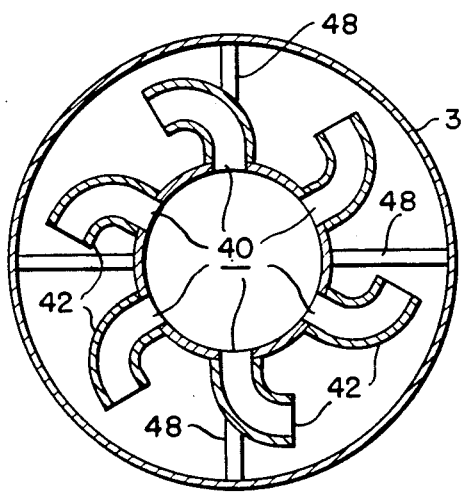
FIG. 4 is a cross-sectional view taken along line 4—4 of FIG. 3.

Referring specifically to FIGS. 3 and 4 which depict the details of a separator 22, the reference numeral 36 refers to an upright cylindrical shell through which the riser pipe 24 extends in coaxial relationship. The riser pipe 24 has a flanged end portion 24a which is bolted to the girth baffle 18 (FIG. 1) and receives a mixture of a water and steam from the tubes 14.

A cap 38 extends over the upper end of the pipe 24 and a plurality of slots 40 (FIG. 4) are formed through the upper wall portion of the pipe 24. A plurality of substantially spiral shaped arms 42 are connected to the pipe 24 in registry with the slots 40 with the free ends of the arms being open to permit the water-steam mixture to discharge therefrom in a substantially tangential direction relative to the shell 36.

A support structure is provided within the shell 36 for supporting the riser pipe 24 within the shell in the coaxial position shown. As a non-limitive example, the support structure can include a plurality of upper support struts 46 and/or a plurality of lower support struts 48.

A wire mesh unit 50 is disposed at the upper end portion of the shell 36 for filtering any entrained water particles from the steam exiting from the separator and is retained by a cross assembly 52 (FIG. 2). The unit 50 is supported in the position shown by a bolt assembly 54 extending in threaded engagement with the cap 38 of the riser pipe 24.

As a result of the above, the mixture of water and steam entering the end portion 24a of the riser pipe 24 rises upwardly in the riser pipe and then passes radially outwardly from the pipe through the slots 40 and into the arms 42 where it is directed tangentially against the inner wall of the shell 36. This creates a vortex, or swirling stream of fluid with the resulting centrifugal forces causing the vapor portion of the mixture to travel away from the inner wall of the shell 36 and towards the center of the swirling stream and pass upwardly, by virtue of its buoyance, into the upper portion of the shell 36 and through the wire mesh unit 50. The water portion of the mixture collects on, and flows down, the inner wall of the shell 36 until it falls into the reservoir of water disposed above the girth baffle 18 (FIG. 1), before passing through the vortex eliminator 28 and into the downcomer 16 for recirculation.

Referring again to FIG. 1, the steam from the separators 22 passes upwardly through the chevron driers 30 into the dry box 32 whereby the steam is dried and separated from any entrained water particles before passing outwardly from the drum 12 through the discharge tubes 17 as shown by the dashed flow arrows in FIGS. 1 and 3.

In view of the foregoing, an efficient and compact steam processing apparatus is provided which enables the drum length to be decreased relative to the furnace width dimension for a given capacity unit, and thus permits an increase in loading per foot of drum length. In addition, the decreased drum length reduces material and erection costs for the drum, and the number of riser circuits to, and drum steam discharge tubes from, the drum.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A steam processing apparatus comprising a cylindrical drum, baffle means disposed in said drum for dividing the interior of said drum into an inlet chamber and an outlet chamber, first inlet means for introducing a mixture of water and steam into said inlet chamber, second inlet means located in a spaced relationship to said first inlet means and operable independently of said first inlet means for introducing additional water into said inlet chamber independently of the introduction of the steam/water mixture, said additional water mixing with the steam/water mixture, a plurality of separators disposed in said outlet chamber and communicating with said inlet chamber for receiving the steam/water mixture and separating the water from the steam, first outlet means for receiving the separated water from said separators and discharging the separated water from said drum, and second outlet means for receiving the separated steam from said separators and discharging the steam from said drum, wherein said drum is formed by at least one wall and wherein said first inlet means comprises a plurality of pipes extending through said at least one wall of said drum and communicating with said inlet chamber and wherein said second inlet means extends horizontally in said inlet chamber between said baffle means and the corresponding portion of said at least one wall.

* * * * *